US012534344B1

(12) United States Patent
Duerrer et al.

(10) Patent No.: US 12,534,344 B1
(45) Date of Patent: Jan. 27, 2026

(54) HANDRAIL AND METHOD FOR MANUFACTURING HANDRAIL

(71) Applicant: Semperit AG Holding, Vienna (AT)

(72) Inventors: Albrecht Duerrer, Bad Vöslau (AT); David Mandl, Krumbach (AT); Florian Karl Arthofer, Bad Fischau-Brunn (AT); Simone Viola Radl, Ternitz (AT)

(73) Assignee: Semperit AG Holding, Wein (AT)

( * ) Notice: Subject to any disclaimer, the term of this patent is extended or adjusted under 35 U.S.C. 154(b) by 222 days.

(21) Appl. No.: 18/572,440

(22) PCT Filed: Jun. 21, 2022

(86) PCT No.: PCT/EP2022/066809
§ 371 (c)(1),
(2) Date: Dec. 20, 2023

(87) PCT Pub. No.: WO2022/268765
PCT Pub. Date: Dec. 29, 2022

(30) Foreign Application Priority Data

Jun. 21, 2021 (DE) .................... 10 2021 115 997.0

(51) Int. Cl.
*B66B 23/24* (2006.01)

(52) U.S. Cl.
CPC .................................. *B66B 23/24* (2013.01)

(58) Field of Classification Search
CPC .................................................... B66B 23/24
USPC ......................................................... 198/337
See application file for complete search history.

(56) References Cited

U.S. PATENT DOCUMENTS 3,463,290 A * 8/1969 Tajima .................... B66B 23/24 198/337
3,633,725 A * 1/1972 Smith ..................... B66B 23/24 198/337
5,255,772 A 10/1993 Ball et al.
6,673,431 B1 * 1/2004 Ledzinski .............. B66B 23/24 428/292.1
7,200,915 B2 4/2007 Keun
8,006,823 B2 * 8/2011 Holzner .................. B66B 23/24 198/337
8,186,498 B2 * 5/2012 Kawasaki .............. B66B 23/24 198/337
8,820,511 B2 * 9/2014 Haider ...................... B32B 3/04 198/337
9,481,552 B2 * 11/2016 Kawasaki .............. B66B 23/24
10,160,623 B2 * 12/2018 Kenny .................... B32B 27/12
(Continued)

FOREIGN PATENT DOCUMENTS

CN 103964288 B 3/2016
CN 103991205 B 4/2017
(Continued)

OTHER PUBLICATIONS

European Patent Office; International Search Report; Sep. 8, 2022; entire document.

*Primary Examiner* — Mark A Deuble
(74) *Attorney, Agent, or Firm* — Price Heneveld LLP

(57) ABSTRACT

A handrail mountable on a guide element for moving walkways, escalators or the like, and having a largely constant cross-section along a profile direction the handrail including a carcass configured to be arranged on the guide element, and a cover layer arranged on the carcass, wherein the cover layer comprises a thermoplastic elastomer.

20 Claims, 9 Drawing Sheets

(56) References Cited

U.S. PATENT DOCUMENTS

| | | | |
|---|---|---|---|
| 10,350,807 | B2 | 7/2019 | Kenny et al. |
| 11,975,943 | B2 * | 5/2024 | Guo ........................ B32B 27/40 |
| 2009/0123714 | A1 | 5/2009 | Qureshi |
| 2021/0370616 | A1 * | 12/2021 | Crosby ............. B29C 66/02241 |
| 2024/0279029 | A1 * | 8/2024 | Tanov ..................... B32B 27/40 |

FOREIGN PATENT DOCUMENTS

| | | | |
|---|---|---|---|
| DE | 3921887 | C2 | 11/1992 |
| DE | 69314144 | | 4/1998 |
| DE | 19832158 | A1 | 2/1999 |
| DE | 19742258 | A1 | 4/1999 |
| DE | 10208958 | C1 | 8/2003 |
| DE | 112006003032 | B4 | 7/2020 |
| EP | 0185006 | B1 | 1/1989 |
| EP | 1362893 | A1 | 11/2003 |
| EP | 2282964 | B1 | 4/2013 |
| EP | 3291980 | A1 | 3/2018 |
| JP | S5957464 | A | 4/1984 |
| JP | H0379588 | A | 4/1991 |
| JP | 2000071353 | A | 3/2000 |
| JP | 2002524372 | A | 8/2002 |
| JP | 2003327380 | A | 11/2003 |
| JP | 2005179018 | A | 7/2005 |
| JP | 2006076069 | A | 3/2006 |
| JP | 4372617 | B2 | 9/2009 |
| JP | 4376614 | B2 | 9/2009 |
| JP | 4463052 | B2 | 5/2010 |
| JP | 2016193794 | A | 11/2016 |
| RU | 15337 | U1 | 10/2000 |
| RU | 2717807 | C2 | 3/2020 |
| WO | 00016007 | | 1/2000 |

* cited by examiner

HANDRAIL AND METHOD FOR MANUFACTURING HANDRAIL

BACKGROUND

The present invention relates to a handrail and a method of manufacturing the handrail.

Handrails are used on escalators and moving walkways to provide support for the person using the escalator or moving walkway. Handrails for escalators and moving walks are usually C-shaped profiles made of rubber or plastic. They must be operated in accordance with regulations at the escalator step or moving walkway pallet speed or a maximum of 2% faster and have a maximum gap from a guide of less than 8 mm. Regardless of the ambient conditions and taking into account millions of bending cycles, the handrail must have good tensile behaviour, high tear resistance and high dimensional stability.

In recent years, the technical performance and visual appearance of handrails have been subject to increased demands, while cost pressures have risen at the same time and are being countered by savings in terms of materials, complexity, component quality and design. The trend towards urbanisation means that more and more people have to be transported faster and faster on escalators and moving walkways. The operating time of the systems has increased dramatically and many applications are in operation 24/7. Architects and operators have also set ever higher criteria for the use and operation of escalators and the operating conditions have become ever more demanding. For example, escalators are installed behind large glass walls or outdoors without protection from the weather. Furthermore, an environment characterised by air pollution, high ambient temperatures and extreme weather events has a negative effect on the durability of handrails.

At the same time, increased demands are placed on visual appearance.

Furthermore, the dimensions of a handrail have to remain within the required narrow tolerance range even after several years of operation. Traction should always be controllable in wet and dry conditions and environmental contamination must not have a negative impact on the performance of a handrail. The function of a handrail must not be impaired by cracking or abrasion and anti-ageing agents must not contaminate the surface. Furthermore, higher concentrations of nitrogen oxides in places with high population density and high individual traffic, high humidity, temperature changes, smaller bending radii to save installation costs, lower maintenance, etc. further limit the performance of handrails and require improvements in handrail design, processes and materials.

Conventional rubber handrails have one or more inner layers of rubber and fibres or fabric that improve transverse rigidity and dimensional stability. The top layer often consists of an SBR polymer, for example. All layers are joined together in a sandwich construction before being vulcanised in a press mould. Conventional plastic handrails, on the other hand, are usually made from plastic compounds.

Rubber handrails offer better durability and good performance over their lifetime. However, in applications in areas with higher temperatures and ozone concentrations, anti-ageing components can rise to the surface of the handrails and contaminate users' hands.

Plastic handrails provide a shiny surface but have disadvantages in dynamic behaviour and in use on some escalator types, as they are less dynamically deformable.

Rubber handrails are currently the most commonly installed handrails. Such handrails are quite flexible in both bending directions—positive and negative—and have good dynamic behaviour and good wear resistance. However, they have limitations at high temperatures, in direct sunlight or in outdoor conditions with high ozone pollution. Under such conditions, protective ingredients of the rubber handrail soil the handrail surface excessively, which leads to negative customer feedback-especially in the summer months. Lowering the amount of protective ingredients or using other ingredients in the rubber handrail can dramatically reduce the durability and service life of the rubber handrail.

Plastic handrails have become increasingly popular in recent years due to their shiny surface. However, the increased bending stiffness, especially when bending backwards (negative bending), has an impact on the traction performance of the plastic handrail on escalators with small handrail traction wheels, as a stiffer handrail requires more bending effort, which leads to loss of traction and higher energy consumption. Another disadvantage is an increased risk of roller breakage in the area of the balustrade heads of the escalator and the escalator return, as the handrail does not always follow the bending curves of the guide rollers (fewer contact points bearing the same load, increased contact pressure and therefore higher risk of breakage).

None of the prior art handrails offers unrestricted usability including under stressful environmental conditions, while also ensuring efficient operation. The known solutions have one disadvantage or another.

SUMMARY

The present invention solves these objects with a handrail having the features of claim 1 and with a method for manufacturing such a handrail having the features of claim 15. Preferred embodiments are the subject of the dependent claims.

One aspect of the present invention provides for a handrail for moving walkways, escalators or the like which is mountable or mounted on a guide element, wherein the handrail has a largely constant cross-section along its profile direction. The handrail preferably comprises a carcass that can be arranged or is arranged on the guide element. The handrail preferably comprises a cover layer that is arranged on the carcass. The cover layer preferably comprises a thermoplastic elastomer.

With prior art rubber handrails, it is not possible to apply a plastic layer without further ado, as the connection between the handrail surface and the plastic layer would not have sufficient adhesion (adhesive force or adhesion force). In other words, the adhesion between plastic and rubber is poor and does not provide the adhesion force required for handrails. For this reason, a plastic handrail is currently used instead of a plastic layer on a rubber handrail. No carcass is required for common plastic handrails, as these handrails derive their stability from the plastic material, which is significantly more stable than rubber. Providing a carcass here would be superfluous and would not bring any advantages. Rather, this would entail cost disadvantages, as processing is complex and no advantages are apparent from such a combination.

Compared to common handrails, the handrail according to the invention offers the advantageous dynamic behaviour of rubber handrails and the advantageous surface properties of plastic handrails. This means that the handrail according to the invention can be used on all escalators and moving walkways (including those with small bending radii) and regardless of the ambient climatic conditions. Preferably, the cover layer comprises a thermoplastic elastomer, which can be applied more easily to a carcass and at the same time has a similar resistance to environmental factors as known plastic handrails.

The handrail extends along a profile direction with an essentially consistent cross-section. This allows the handrail to move relative to a guide element in the profile direction in order to provide a person (user) standing on a moving walkway or escalator with a secure hold. During the movement of the handrail, it can be guided by a guide element, such as a rail. The guide element allows the handrail to be bent positively (i.e. upwards) and negatively (i.e. downwards). For this purpose, the handrail can at least partially surround the guide element. Preferably, the handrail has a C-shape in a cross-section transverse to the profile direction, which partially surrounds the guide element. Consequently, the handrail can be mounted or is mountable on the guide element. The handrail can therefore have a C-shape in cross-section transverse to the profile direction. The cross-section along the profile direction of the handrail can be largely constant or uniform. This also includes deviations due to manufacturing tolerances of up to 15%. The cross-section of the handrail can be divided into two curved end sections and a flat centre section connecting the end sections. The end sections can be symmetrical with respect to an axis that runs through the centre of gravity of the cross-section of the handrail. This makes the handrail particularly easy to manufacture. The handrail can be designed as a continuous and circumferential element without an end or beginning. The handrail can therefore be designed in such a way that it can be deflected and/or bent (positively and negatively) via a large number of deflection rollers in addition to the guide element. Making the handrail easier to bend (i.e. giving it a low bending resistance) significantly reduces the energy required to drive the handrail. The cover layer can be located at least partially on a surface of the handrail. For example, the cover layer can be embedded in the carcass in places and, together with the carcass, form a flat surface that can be gripped by a user, for example. In particular, it is advantageous for the cover layer to be attached to the carcass in the areas where the carcass is bent or curved in cross-section. This saves on material on the one hand and gives the handrail a pleasant feel on the other. Additionally or alternatively, the cover layer can be provided as sectional projections on the carcass. For example, the cover layer can extend as strip-like elements along the profile direction. This means that the surface of the cover layer 3, which can be gripped by a user, can have a textured surface. In cross-section, this texturing can take the form of curvatures, for example. Consequently, the contact area between a user's hand and the handrail can be reduced, which can improve the user's perception of hygiene. Preferably, the cover layer is arranged on the handrail in such a way that it covers the side of the handrail facing away from the guide element. This ensures that the handrail is reliably protected against environmental factors. In one embodiment, the top layer can be designed in such a way that it forms a surface with multiple curvatures which can be gripped by a user. This means that the handrail can provide a user with a particularly secure hold.

The end areas of the cross-section of the handrail can, for example, be 0.3 to 0.8 times thinner than the central area. It was found that this ratio favourably reduces the bending force of the handrail, while at the same time ensuring sufficient lateral stability of the handrail. This can reduce the energy required to drive the handrail and at the same time ensure stable guidance of the handrail even in the event of sudden lateral forces. Furthermore, the handrail can be designed to be used with a drive roller and/or a guide roller with a diameter of less than 500 mm. A wrap angle of 100 to 270° can be achieved. This supports the durability of the handrail because the force per unit area (i.e. the tension) on the handrail is reduced. Preferably, the drive roller and/or a guide roller can have a diameter of less than 400 mm. Due to the high, easily achieved flexibility of the handrail according to the invention, energy-efficient use is also advantageously possible with these small diameters (i.e. the above wrap angles can also be achieved in this case). The handrail can therefore be used advantageously on escalators (e.g. traffic escalators) that have a drive in the balustrade head. In the balustrade head, the wrap angle of the handrail around a drive roller is generally larger.

The carcass of the handrail can comprise at least three different layers and be designed to give the handrail stability along the profile direction and transverse to the profile direction. In particular, the carcass can have a sliding layer that can be brought into contact with the guide element. The sliding layer can minimise friction between the handrail and the guide element. The sliding layer can be made of Teflon or other sliding materials, for example. This further reduces the energy required to drive the handrail. In addition, the carcass can comprise a tensile element (tension member), which can be an expansion brake made of steel, polymer or carbon fibre. The tension element can absorb tensile force so that the maximum possible elongation of the handrail can be achieved according to the tension element used. The tension element can ensure that elongation of the handrail in the profile direction is limited over the service life. The tension element can only be provided in the centre area of the cross-section of the handrail. This means that the end sections can easily be raised and the overall weight of the handrail can be kept low. The carcass may further comprise at least one inner layer (for example, a primary layer comprising rubber, thermoplastic elastomer, fabric or a combination thereof). Furthermore, the carcass can have a secondary layer, in particular a cover comprising rubber and/or a thermoplastic elastomer. The secondary layer can, for example, cover the tension member so that it is inserted between the primary layer and the secondary layer. The primary layer can be a separate layer from the carcass, which is only bonded to the carcass during production. The layer can be an independent, in particular an inherently stable, element (i.e. the layer is in particular not a material that is applied in any way). The same can also apply to the secondary layer. Damage caused by the tension member, particularly to the sliding layer, can therefore be avoided. This ensures sufficient stability of the carcass.

The expansion brake (i.e. in particular the tension element) and sliding layer can be combined in one layer. This means that the carcass can have a simple design, which makes it easier to manufacture. A combination of expansion brake and sliding layer is particularly suitable for relatively short handrails, where lower tensile forces occur than with long handrails.

The carcass, which is preferably designed as a sandwich construction, allows for dynamic behaviour of the handrail, as is common, for example, in rubber handrails. Preferably, a carcass the structure and manufacture of which corresponds to a carcass for rubber handrails can be used. This means that an increase in the complexity of semi-finished products or production processes can be avoided. One particular difference to rubber handrails is that a thermoplastic elastomer (TPE) can be used in the top layer. The cover layer can be applied to the carcass using standard manufacturing processes such as compression moulding, casting, dipping, spraying, painting and/or extrusion. The cover layer can be applied to an upper layer of the carcass.

In a further embodiment, the carcass can have at least one element projecting from the carcass, which is arranged on the side of the carcass opposite the cover layer. The protruding element can be designed as an element that tapers in the direction of protrusion (e.g. as a wedge). Furthermore, the protruding element can be designed to come into contact with a guide element on which the handrail is guided. Consequently, the guidance of the handrail on the guide element can be improved.

The surface of the carcass can consist of coated and/or treated fabric, such as cord or fibre (e.g. carbon, polyamide, polyester). Possible treatments include coatings such as resorcinol-formaldehyde latex (RFL), polyvinyl chloride (PVC), thermoplastic elastomers (TPE), rubber, isocyanate, adhesives, etc.

In the case of a transparent cover layer material, the carcass could have a further function. For example, the carcass can include a light source that emits a light signal depending on the operating status of the handrail (e.g. speed of the handrail, temperature). The light signal can be visible through the transparent cover layer. A large number of LEDs can be provided in the carcass which, for example, indicate the temperature and/or speed of the handrail by means of their light colour. Furthermore, flows of people can be controlled by means of the light source. For example, a light signal similar to a traffic light can be used when the escalator or moving walk is boarded so that the handrail signals to waiting passengers when they are allowed to board. It is also possible to indicate the direction of movement of the handrail by displaying patterns such as arrows or similar. In addition, a light signal can be used to indicate the spacing which people must observe on the moving walkway or escalator in order to comply with the relevant distancing rules. For the above functions, the handrail can have sensors that record the corresponding information for forwarding to users. Furthermore, the handrail can have a control unit that is designed to control light sources based on the information obtained from the sensors. These can be temperature and/or motion sensors.

The material thickness of the cover layer may depend on the planned use of the handrail. The material thickness is preferably in the range of a few micrometres up to 12 mm. In this context, it has been shown that the handrail has the desired properties in terms of resistance to environmental factors such as UV exposure, ozone exposure, large temperature fluctuations, etc. and is also sufficiently flexible to be used efficiently even with small radii of drive rollers. The ratio of the material thickness of the cover layer to the bending radius of the handrail is preferably in the range 0.005 to 0.0125. In this area, it was found that there is an optimum ratio between the longitudinal and transverse rigidity and the flexibility of the handrail. This means that the handrail can be safely guided on drive and guide rollers while minimising the energy required to drive the handrail. In this case, the bending radius is a radius of an imaginary circle around which the handrail can wrap itself with a wrap angle of 100° to 270° without damage (i.e. without plastic deformation) and without shortening the service life of the handrail. This is particularly important when using the handrail on compact moving walkways or escalators, as very small guide rollers and/or drive rollers are often used. The cover layer can provide a safe and comfortable hold for the user when using the escalator or moving walkway. The above ratio of the material thickness of the cover layer to the bending radius of the handrail is preferably in the range 0.005 to 0.0075. In this context, particularly efficient operation can be achieved with C-shaped cross-section handrails, as the shape of the handrail increases stability and the thinner cover layer ensures efficient operation.

The thermoplastic elastomer (TPE) can be a special plastic that behaves similarly to classic elastomers at room temperature, but can be plastically deformed when heat is applied and therefore exhibits thermoplastic behaviour. Other elastomers, for example, include chemically wide-meshed cross-linked spatial network molecules. The cross-linking of such elastomers cannot be dissolved without decomposing the material. In contrast, a thermoplastic elastomer can be a material in which elastic polymer chains are incorporated into thermoplastic material. This allows a thermoplastic elastomer to be processed in a purely physical process involving a combination of high shear forces, heat and subsequent cooling. Although no chemical cross-linking involving time-consuming and temperature-intensive vulcanisation is necessary as with other elastomers, a thermoplastic elastomer can exhibit rubber-elastic properties thanks to its special molecular structure. The bending resistance of the cover layer can therefore be reduced. The thermoplastic elastomer has physical cross-linking points (secondary valence forces or crystallites) in some areas, which dissolve when heated without the macromolecules decomposing. They are therefore much easier to process than other elastomers. This means that the cover layer can also be recycled easily after the handrail has been used, which improves the overall life cycle assessment of the handrail.

The handrail can be used, for example, on moving walkways or escalators that provide continuous cleaning of the handrail surface. This can be achieved by the resistant cover layer. This means that the long service life of the handrail according to the invention can be maintained even if the handrail is continuously cleaned. Particularly in the context of the Covid-19 pandemic, the handrail surface can be treated with continuous UV light sources to reduce contamination with viruses and bacteria. Such cleaning devices can be used in the return of the escalator.

Consequently, the present invention provides a handrail which has a high resistance to environmental factors while allowing efficient operation of the escalator or moving walkway on which the handrail is provided. This property can be achieved by using a carcass in conjunction with a cover layer comprising a thermoplastic elastomer. The effect of the combination is surprising, as a cover layer made of thermoplastic elastomer does not actually require stabilisation (e.g. by means of a carcass), as it has a high inherent stability. A carcass is usually only necessary for soft or rubber-like cover layers in order to give the handrail the necessary stability.

Preferably, the thermoplastic elastomer contains polyurethane.

Polyurethane can have different properties depending on the choice of polyisocyanate and polyol. The polyurethane can be used in an unfoamed state to increase the resistance of the cover layer. The density of the polyurethane can vary between 1000 and 1250 kg/m$^3$. In this way, the necessary stability of the top layer can be achieved. Furthermore, polyurethane can have good adhesion properties with the carcass and can therefore be applied to it to good advantage. Polyurethane is also highly resistant to solvents, chemicals and weathering.

In one embodiment of the present invention, a polyurethane cover layer is provided which has a material thickness of 1.5 to 3.5 mm at least in the central area. The cover layer can have a Shore hardness of 75 to 85 ShA. Shore hardness can be measured in accordance with ISO 48-4:2018. In this case, the transverse rigidity of the handrail can be increased by at least 20% compared to a rubber handrail. In particular, the cover layer can also have the same material thickness in the end sections as in the central area. This can increase the rigidity of the end sections, which can prevent the handrail from pulling out of the guide element during operation. Furthermore, longitudinal rigidity can be reduced by more than 40% compared to a comparable plastic handrail, as the handrail is more flexible thanks to the use of polyurethane. This results in fewer losses when operating the handrail, meaning that it can be operated more efficiently.

Preferably, the carcass has a primary layer facing the cover layer and a tension element that extends in the profile direction of the handrail.

The primary layer can be an upper layer of the carcass. The primary layer can be directly connected to the cover layer. The primary layer can therefore be designed to create the connection between the cover layer and the carcass. The primary layer can be made of fabric. In this case, the primary layer can contribute to the overall stability of the carcass. Preferably, the primary layer comprises TPE and/or rubber (e.g. rubber composite product). In this case, an adhesive force of at least 5 $N/mm^2$ can be achieved. Furthermore, readily available standard semi-finished products can be used to manufacture the carcass (of the sort used to make rubber handrails, for example). This means that the efficiency and effectiveness of handrail production can be maintained at a high level.

In addition or as an alternative to the treatment of the primary layer with the substances mentioned above, the primary layer can be textured on its upper side facing the cover layer. The texture can create a defined roughness. For example, the texture can include indentations (depressions) and/or holes. This can have a further positive effect on the adhesive force between the carcass and the cover layer.

Furthermore, the primary layer can be a rubberised fabric. The rubberised fabric can be vulcanised to increase the internal stability of the primary layer. Furthermore, the rubberised fabric can have an adhesion promoter (for example one of the above finishes or combinations thereof) to ensure reliable adhesion of the cover layer to the carcass. The rubberised fabric can also be swollen with other materials. For this purpose, the rubberised fabric can include swelling materials or be swollen with materials. This provides a reliable connection between the carcass and the top layer. The selection of substances to be used for swelling the rubberised top layer (especially solvents) can be optimised using the Hansen solubility parameter system. The Hansen solubility parameters are three-dimensional solubility parameters. They comprise a dispersion component resulting from London interactions ($\delta D$), a component from dipolar interactions ($\delta P$) and a component for the hydrogen bonds ($\delta H$). Preferably, a substance is used the parameters $\delta D$, $\delta P$ and $\delta H$ of which lie in a range for the solubility parameters of the material of the cover layer (where the cover layer comprises, for example, polyurethane) and the carcass (i.e. the uppermost layer of the carcass facing the cover layer) of +/−4. This means that a wide range of swelling materials is available to ensure a secure hold between the top layer and the carcass. More preferably, the solubility parameter of the substance to be used lies between the two solubility parameters. It was found that a particularly good grip between the carcass and the top layer is achieved in this context, even if the handrail is guided around rollers with small radii. Furthermore, it is preferable that the solubility parameters of the material to be used lie in a range of the mean value of the material of the carcass (for example the top layer of the carcass) and the cover layer +/− half the difference in the solubility parameters of the two materials. In this case, a particularly good grip of the cover layer on the carcass can be achieved if the cover layer comprises polyurethane.

For reinforcement, the primary layer can have transverse reinforcement that provides reinforcement at right angles to the profile direction of the handrail. The transverse reinforcement can comprise fibre, cord and/or a fabric. This ensures secure guidance of the handrail on the guide element.

Preferably, the primary layer is made of an elastomer and the tension element is embedded in the primary layer.

The primary layer can therefore be formed as an elastomer insert that completely surrounds the tension element. The advantage here is that processing of the semi-finished products is simplified. The tension element also prevents damage to other elements of the handrail, as it is shielded or protected from the primary layer. For example, contact between the tension element and the sliding layer can be effectively prevented without the need to provide an additional layer to protect the sliding layer.

Preferably, the primary layer has a fibre reinforcement transverse to the profile direction of the handrail, and the fibre reinforcement preferably comprises glass, carbon, polyamide and/or polyester.

As described above, this can increase the transverse stability of the primary layer and thus of the entire handrail, allowing it to be guided securely on the guide element. Preferably, the primary layer only has the fibre reinforcement in the two end areas. This means that the end areas in particular can be reinforced, which makes the handrail highly resistant to transverse loads and prevents it from being pulled away unintentionally. As a result, the handrail can be guided even more securely on the guide element, guide rollers and drive rollers.

Preferably, the primary layer has a large number of holes at least on the side facing the cover layer.

The holes can be indentations on the side of the primary layer facing the cover layer. This can improve mechanical adhesion between the carcass and the cover layer. Furthermore, the holes can be through-holes that extend through the primary layer. This makes it easier to produce the holes, which increases the efficiency of the handrail manufacturing process. In addition, the advantages already mentioned above can be achieved with the holes (texturing of the primary layer).

Preferably, the primary layer is formed from a rubberised fabric, in particular vulcanised fabric; the primary layer preferably comprises chloroprene rubber, natural rubber, styrene- or styrol-butadiene rubber and/or polybutadiene rubber.

Vulcanisation can create a stable bond that has sufficient stability. Furthermore, the entire carcass can be vulcanised in addition to the primary layer. This means that the individual components of the carcass can be easily bonded to each other. Treating the primary ply with CR (chloroprene rubber), NR (natural rubber), SBR (styrene-butadiene rubber) and/or BR (polybutadiene rubber) can provide good adhesion between the carcass and the cover layer, especially if the cover layer comprises polyurethane. Furthermore, such a carcass or primary layer can be produced or processed on existing machine tools without structural adjustments. This means that manufacturing the handrail can be extremely simple and cost-effective.

Preferably, the primary layer has a surface texture on the side facing the cover layer, in particular indentations in the profile direction and/or transverse to the profile direction.

The surface texture can be a texture that roughens the surface of the primary layer facing the cover layer. For example, indentations, raised areas or a combination of the two can be provided. The indentations are an example of the surface texture of the primary layer. The indentations can take the form of elongated indentations (for example in the form of one or more grooves). Raised areas can protrude away from the primary layer in the form of a material protrusion. Elongated indentations and/or raised areas transverse to the profile direction of the handrail can be provided in the primary layer in order to ensure adhesion of the cover layer to the carcass when forces occur along the profile direction. Additionally or alternatively, the indentations can be provided in the profile direction on the primary layer in order to ensure adhesion of the cover layer to the carcass in the event of forces acting transverse to the profile direction. Preferably, the indentations are inclined at an angle of greater than 0° and less than 90° to the profile direction. In this case, adhesion of the top layer to the carcass can be ensured in the event of forces acting both transverse to the profile direction and along the profile direction. The indentations also preferably have an angle of between 30° and 60° to the profile direction. It was found that optimum adhesion of the cover layer to the carcass is achieved in this context, even if the handrail is deflected with radii of less than 400 mm (e.g. by a drive roller).

Preferably, the primary layer has an adhesion promoter on the side facing the cover layer, in particular an insert with a polyurethane-friendly finish.

Adhesion promoters can be substances that create a close physical or chemical bond at the interface between immiscible substances. This means that the cover layer can be effectively attached to the carcass, even if they are made of different materials. In particular, the primary layer may comprise resorcinol-formaldehyde latex (RFL), polyvinyl chloride (PVC), thermoplastic elastomers (TPE), rubber, isocyanate and/or adhesive. Preferably, the primary layer has a finish that provides an adhesion force (also known as peel strength or adhesive force) between the cover layer and the carcass of ≥5 N/mm$^2$. This ensures that the top layer and the carcass are reliably bonded together over the service life of the handrail. In particular, the carcass can be treated with resorcinol-formaldehyde latex (RFL), polyvinyl chloride (PVC), thermoplastic elastomers (TPE), rubber and/or isocyanate or adhesives. In this case, polyurethane cover layers in particular can be advantageously attached to the carcass. If one of the above coatings is used, an adhesive force between the cover layer and the carcass of at least 5 N/mm$^2$ can be achieved. This ensures a reliable grip between the carcass and the cover, even for handrails that are subject to high levels of environmental stress. Furthermore, a chemically reactive "hot melt film" can be used to create adhesion between the carcass and the cover layer. The film can be provided on the side of the carcass facing the cover layer and vulcanised together with the carcass and the cover layer. The film offers the advantage that it is solvent-free and has a low material price. It is also quick and easy to process. This means that different materials can also be joined together easily.

Preferably, the handrail has a sliding layer that is arranged on the carcass in such a way that it can be brought into contact with the guide element.

In other words, the sliding layer can be provided on the handrail in such a way that it faces the surroundings (i.e. is not covered by other layers) and can therefore be placed on the guide element. The sliding layer is preferably provided on the carcass. This simplifies the work stage, as only the cover layer needs to be attached to the finished carcass. As already described above, the sliding layer can reduce friction between the handrail and the guide element, so that efficient operation of the handrail is possible. The sliding layer can be arranged on the handrail in such a way that the tension element is located between the sliding layer and the cover layer.

Preferably, the carcass comprises a secondary layer so that the traction element is inserted between the primary layer and the secondary layer.

The secondary layer can be designed in the same way as the primary layer. This provides a symmetrical bending load distribution in the handrail, which extends the overall service life of the handrail. Nevertheless, the secondary layer can be a separate layer that is separated from the primary layer, for example by another layer (e.g. the tension element). The secondary layer can also protect the sliding layer from direct contact with the tension element. This ensures the durability of the sliding layer.

Preferably, the primary layer and/or the secondary layer comprises a fabric structure or belt structure.

This can increase the strength of the primary and/or secondary layer. In particular, the overall tensile strength of the handrail can be increased. Nevertheless, the fabric or belt structure can provide sufficient elasticity so that the handrail can adapt to the guide element and/or the guide and drive rollers with little energy expenditure during operation Preferably, the tensile element comprises steel, aramid, glass fibre and/or carbon.

Accordingly, a handrail with a high tensile strength can be provided so that even very long handrails can be used. Aramid, glass fibre and/or carbon have the further advantage that they are relatively light, which improves the overall efficiency of the handrail operation. Furthermore, these materials are easy to process with a carcass, so that production of the handrail can be simplified.

According to a further aspect of the present invention, a method of manufacturing a handrail is provided, in particular a handrail according to any one of the preceding claims, the method comprising the following steps: Providing a carcass and applying a cover layer to the carcass by means of compression moulding, casting, dipping, painting and/or extrusion, wherein the cover layer comprises a thermoplastic elastomer.

This means that an existing carcass can be used to produce the handrail. In other words, the carcass can be manufactured separately. The carcass can be provided, for example, by unwinding it from a supply roll. This makes it easy to store the carcass. The carcass can be supplied in a fully vulcanised state. The carcass can then be fed into an infeed device. The infeed device pre-tensions the carcass. This prevents the carcass from sagging, which would make it impossible to apply the cover layer precisely (i.e. unwanted fluctuations in the material thickness of the cover layer can be prevented). The carcass can then be fed into a preheater. The carcass can be preheated so that the extruded material does not cool down too quickly during subsequent extrusion, which would mean that the material bond between the cover layer and the carcass would not have the required adhesion force. With this step, an adhesion force between the cover layer and the carcass of at least 5 $N/mm^2$ can be achieved (see also the comments made above in this regard). The carcass can then be fed into an extruder. The extruder can have a cross extrusion head in order to produce the cover layer over the entire cross-section of the carcass. Furthermore, the extruder can be calibrated so that a feed rate can be set for the thermoplastic elastomer to the extruder as a function of the feed rate of the carcass before the actual extrusion of the cover layer in order to be able to achieve the desired material thickness of the cover layer. Once the cover layer has been applied to the carcass, the handrail formed in this way can be fed into a cooling basin. The handrail can then be treated in a bead remover to ensure a smooth and clean surface on the cover layer. This can be followed by a film application stage and/or a labelling stage before the handrail is wound onto a drum winder.

All features and advantages of the device also apply analogously to the method and vice versa. Individual features can be combined with other features to bring together the benefits associated with the features.

BRIEF DESCRIPTION OF THE DRAWINGS

The present invention is described in detail in its preferred embodiments below with reference to the figures. This includes.

DETAILED DESCRIPTION OF THE PREFERRED EMBODIMENTS

Figure 1:
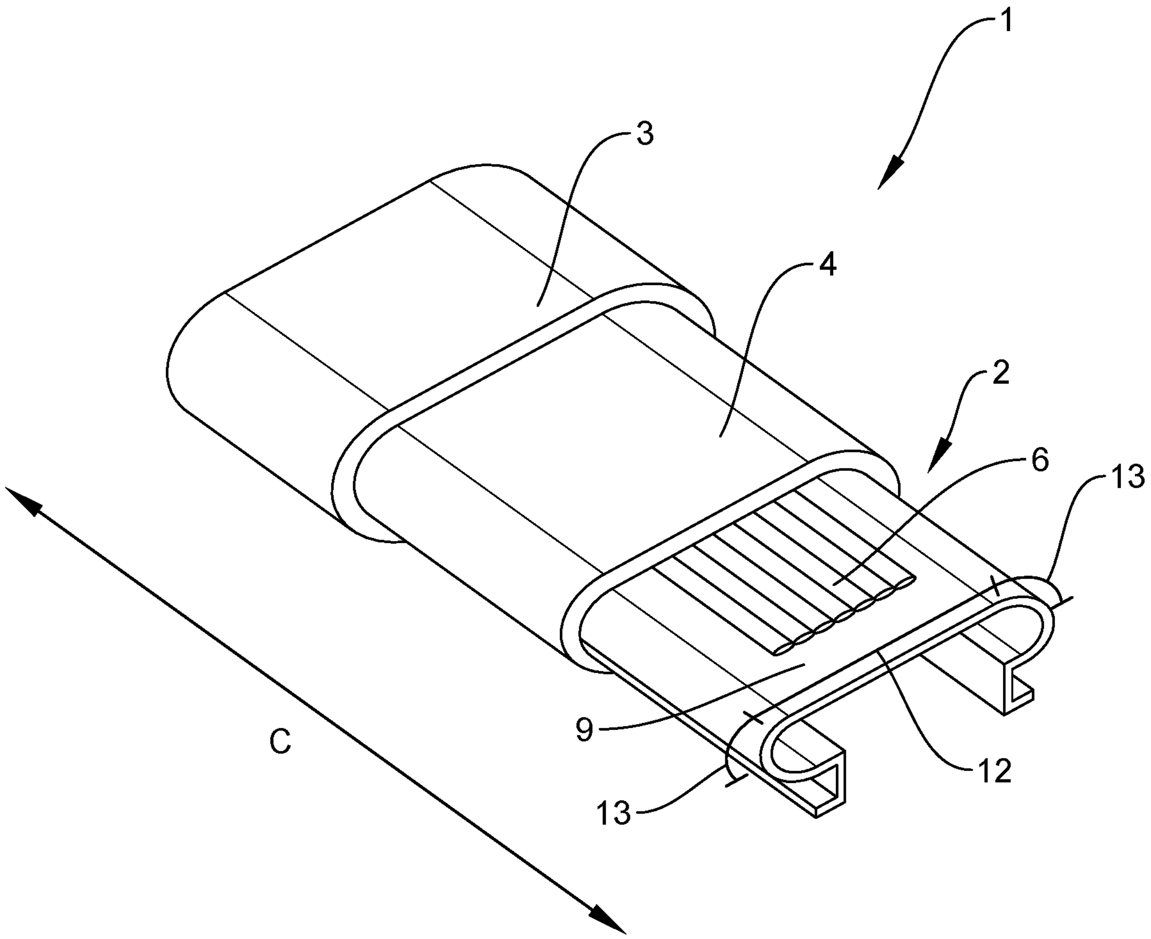
FIG. 1 is a perspective and schematic view of a handrail according to an embodiment of the present invention.

FIG. 1 is a perspective and schematic view of a handrail 1 according to an embodiment of the present invention. In FIG. 1, one layer of the handrail has been cut away to simplify the illustration.

The handrail 1 comprises a carcass 2 and a cover layer 3 attached to it. The carcass 2 comprises a tensile element 6 for absorbing tensile forces, a primary layer 4 and a sliding layer 9. The handrail 1 extends in profile direction C. A cross-section transverse to the profile direction C of the handrail 1 remains largely constant. This enables the handrail 1 to be moved (i.e. guided and driven) in the profile direction C. In the present embodiment, the tension element 6 (also known as the tension member) is made of steel. However, it can also be made of aramid, glass fibre or carbon in order to reduce the weight of the handrail 1. The tension element 6 serves to provide structural stability for the handrail on the one hand and to absorb and transmit tensile forces on the other. The sliding layer 9 is designed to come into contact with a guide element (not shown in the figures). The guide element can be a guide rail, guide rollers and/or drive rollers of an escalator or moving walkway on which the handrail 1 is provided. The primary layer 4 covers the traction element 6 and is designed in particular to give the carcass a certain volume. This means that the handrail 1 can be adapted to the dimensions required by varying the volume (i.e. the dimensions) of primary layer 4. In contrast, it is only possible to vary the volume of the cover layer 3 within narrow limits: if the material thickness of the cover layer 3 were too large, the handrail 1 would become very rigid overall. This would increase the energy required to drive the handrail 1. Furthermore, this would result in variable bending resistance in a positive and negative bending direction of the handrail transverse to the profile direction C, which would lead to disadvantages during operation of the handrail 1. The cover layer 3 comprises a thermoplastic elastomer, which makes the entire handrail highly resistant to environmental factors. Furthermore, in the profile (i.e. cross-section) of the handrail 1 transverse to the profile direction C, the handrail 1 has a flat central area 12 and two curved end areas 13. The cross-section of the handrail 1 is therefore C-shaped. The end sections 13 are symmetrical with respect to an axis that runs through the centre of gravity of the profile of the handrail 1. For reasons of clarity, the edge areas 13 and the central area 12 are not labelled in the following figures.

Figure 2:
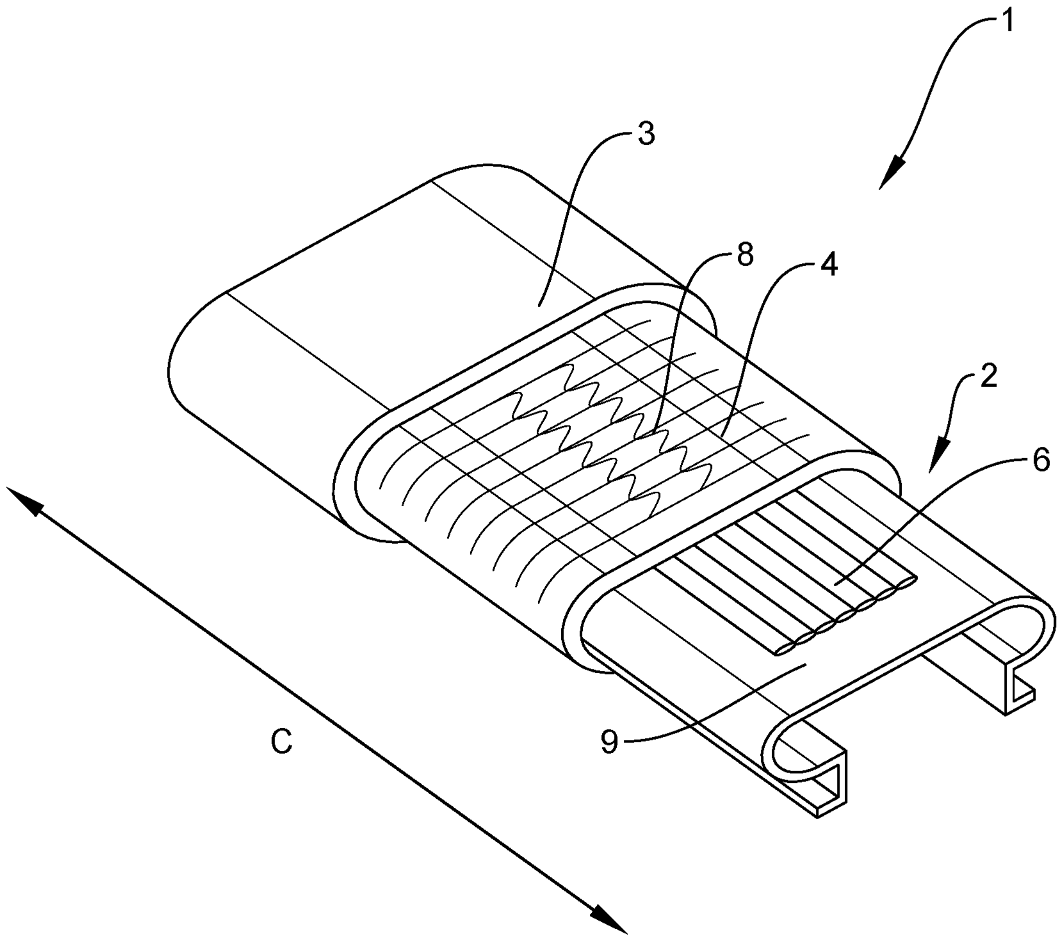
FIG. 2 is a perspective and schematic view of a handrail according to a further embodiment of the present invention.

FIG. 2 is a perspective and schematic view of a handrail 1 according to a further embodiment of the present invention. The handrail 1 shown in FIG. 2 differs from the handrail 1 shown in FIG. 1 in that the primary layer 4 has a surface texture 8. The surface texture 8 can improve the connection between the top layer 3 and the carcass 2. As a result, the handrail 1 can have a longer service life overall. In the present embodiment, the surface structure comprises 8 elongated indentations extending in the profile direction and transverse to the profile direction C. Some indentations are straight and some are curved. This can further increase the bonding force between the cover layer 3 and the carcass 4. Thus, in the present embodiment, an adhesion force between the cover layer 3 and the carcass 2 is increased by mechanical means.

Figure 3:
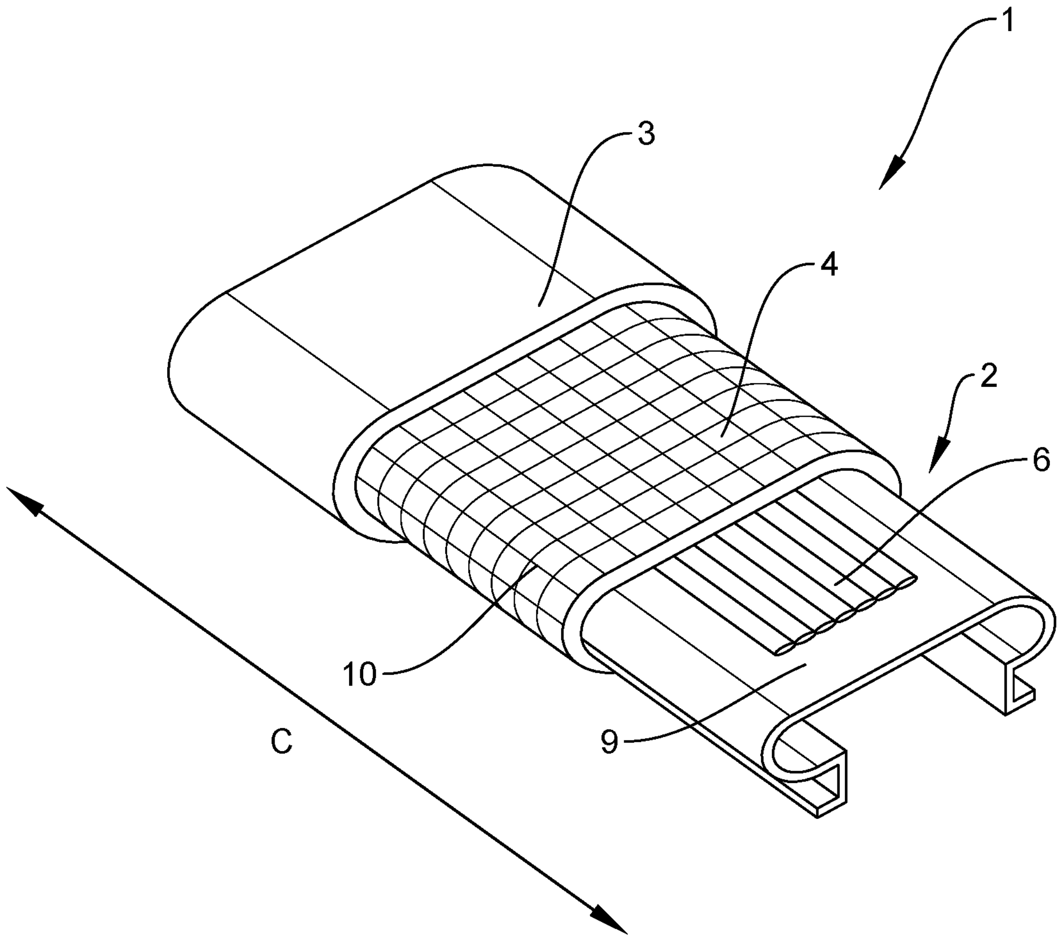
FIG. 3 is a perspective and schematic view of a handrail according to a further embodiment of the present invention.

FIG. 3 is a perspective and schematic view of a handrail 1 according to a further embodiment of the present invention. The handrail 1 shown in FIG. 3 differs from the handrail 1 shown in FIG. 1 and FIG. 2 in that the primary layer has a finish 10 that increases the adhesion force between the cover layer 3 and the carcass 2. In this case, this is achieved by a chemical bond by applying at least one substance to the primary layer which interacts with the thermoplastic elastomer of the cover layer 3 in such a way that an adhesive force of at least 5 $N/mm^2$ is achieved. In the present embodiment, the primary layer 4 has resorcinol-formaldehyde latex (RFL) at least on the side facing the top layer 3. In further embodiments, the primary layer 4 comprises polyvinyl chloride (PVC), thermoplastic elastomers (TPE), rubber and/or isocyanate or an adhesive. Thus, in the present embodiment, an adhesion force between the cover layer 3 and the carcass 2 is increased by chemical means. In particular, a combination with the mechanical means described above is advantageous in further increasing the adhesion force.

Figure 4:
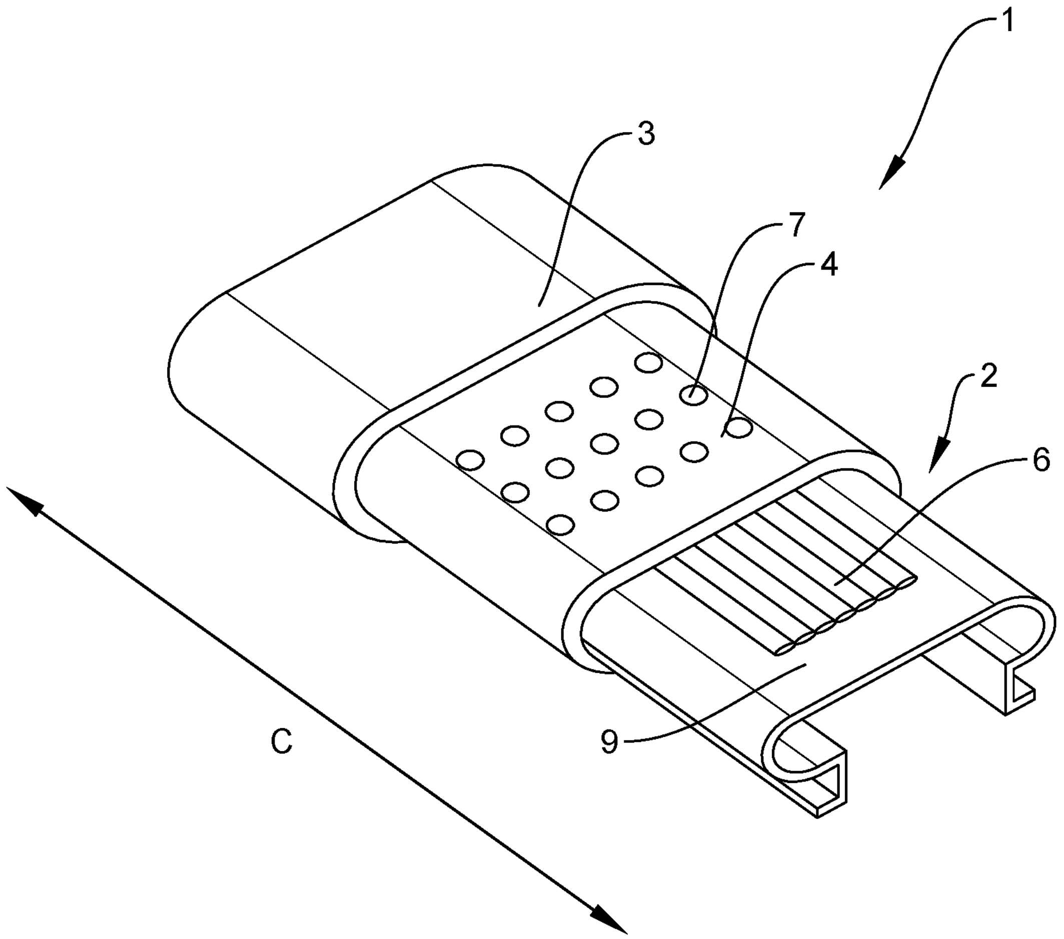
FIG. 4 is a perspective and schematic view of a handrail according to a further embodiment of the present invention.

FIG. 4 is a perspective and schematic view of a handrail 1 according to a further embodiment of the present invention. The handrail 1 shown in FIG. 4 differs from the previously described embodiments in that the primary layer has holes 7 to increase the adhesion force between the carcass 2 and the cover layer 3. The holes 7 represent a further example of using mechanical means to increase the adhesion force between the top layer 3 and the carcass 2.

Figure 5:
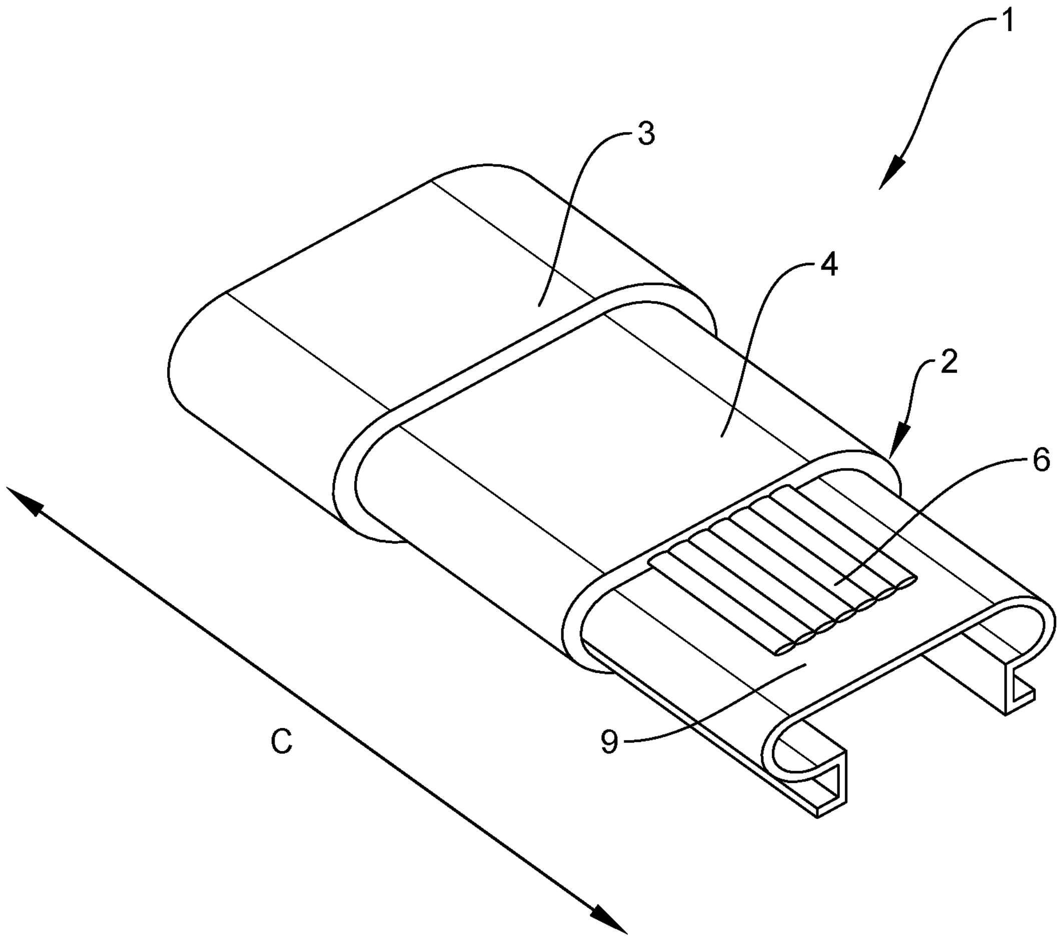
FIG. 5 is a perspective and schematic view of a handrail according to a further embodiment of the present invention.

FIG. 5 is a perspective and schematic view of a handrail 1 according to a further embodiment of the present invention. The handrail 1 shown in FIG. 5 differs from the previously described embodiments in that the tension element 6 is embedded in the primary layer 4. The primary layer comprises an elastomer. Preferably, the primary layer is formed entirely from an elastomer. The primary layer 4 therefore has a high adhesion force with the cover layer 3 and can be advantageously produced together with the tension element 6. In a further embodiment, the primary layer 4 has transverse reinforcements with fibres, cord and/or fabric. This increases the strength of the handrail 1, particularly with regard to forces acting transverse to the profile direction C.

Figure 6:
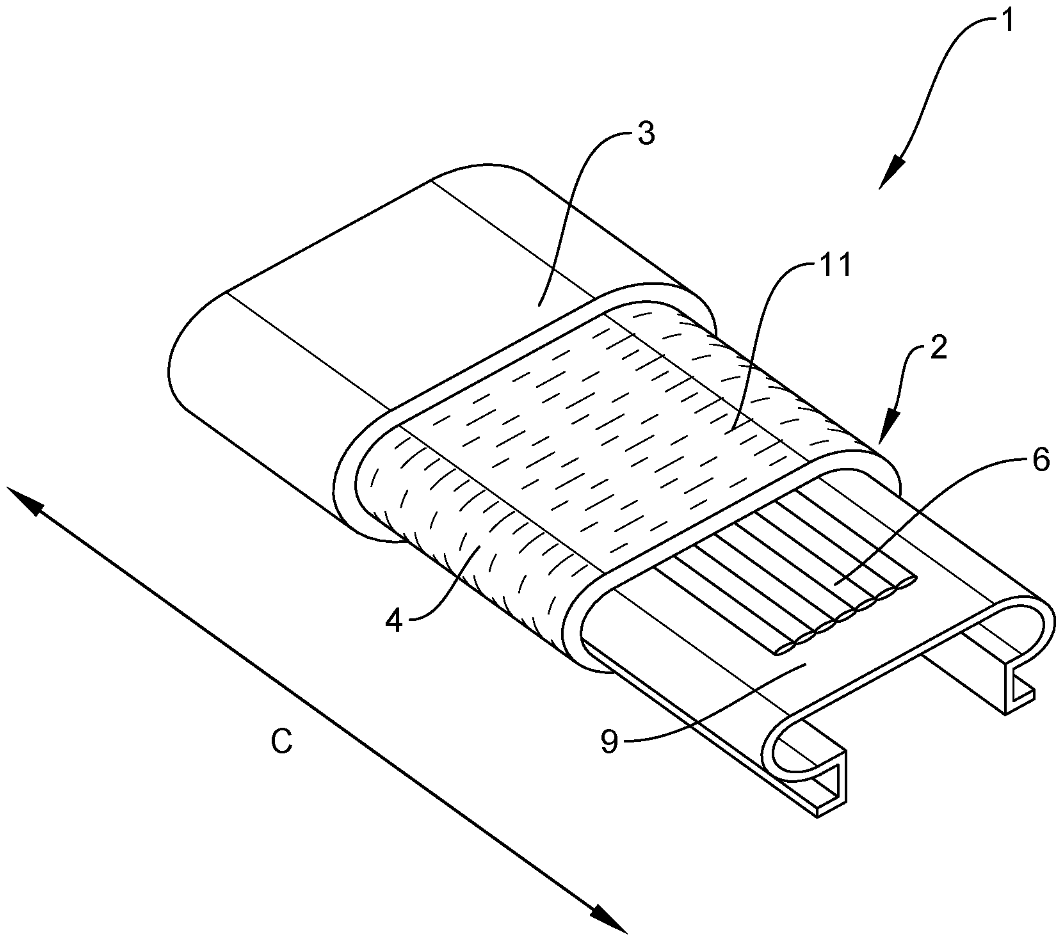
FIG. 6 is a perspective and schematic view of a handrail according to a further embodiment of the present invention.

FIG. 6 is a perspective and schematic view of a handrail 1 according to a further embodiment of the present invention. The handrail 1 shown in FIG. 6 differs from the previously described embodiments in that the primary layer 4 has fibre reinforcement 11 transverse to the profile direction C. As in the embodiment above, this increases the resistance of the handrail 1 to deformation. The handrail can therefore be guided particularly securely on the guide element. In the present embodiment, the fibre reinforcement 11 of the primary layer 4 comprises glass fibres. In further embodiments not shown, the fibre reinforcement 11 comprises carbon fibres, polyamide fibres and/or polyester fibres.

Figure 7:
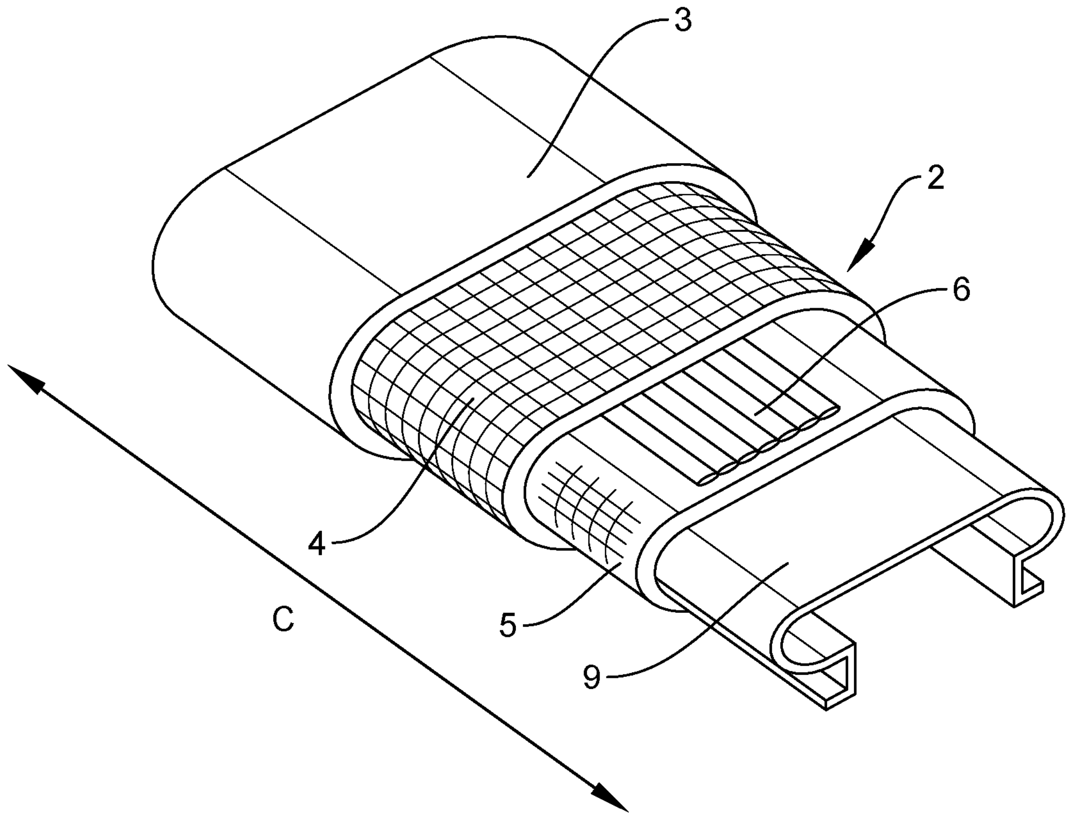
FIG. 7 is a perspective and schematic view of a handrail according to a further embodiment of the present invention.

FIG. 7 is a perspective and schematic view of a handrail 1 according to a further embodiment of the present invention. The handrail 1 shown in FIG. 7 differs from the previously described embodiments in that a secondary layer 5 is provided in the carcass 2. The secondary layer is provided in such a way that the tension element 6 is inserted between the primary layer 4 and the secondary layer 5. Thus, the carcass 2 of the present embodiment is formed from the primary layer 4, the secondary layer 5, the traction element 6 and the sliding layer 9.

The secondary layer 5 can be designed in the same way as the primary layer 2. In particular, the secondary layer 5 can have the other features of the primary layer 4 of the embodiments shown in FIGS. 2 to 4. The secondary layer 5 can thus have the finish 10 described above, the fibre reinforcement 11 and/or the surface texture 8.

Figure 8:
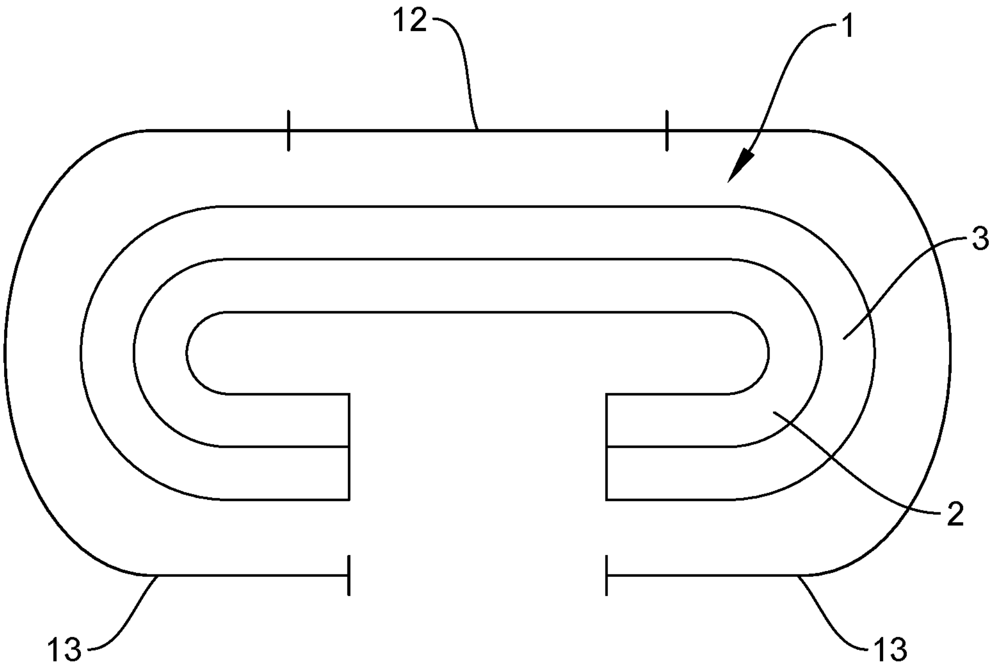
FIG. 8 is a schematic section transverse to the profile direction of a handrail according to an embodiment of the present invention.

FIG. 8 is a schematic section transverse to the profile direction C of a handrail 1 according to an embodiment of the present invention. The handrail 1 essentially corresponds to the handrail 1 shown in FIG. 1. FIG. 8 shows the carcass 2 only schematically and in simplified form. FIG. 8 also shows the centre area 12 and the two adjacent end areas 13. In the present embodiment, the cover layer 3 completely covers the carcass on one side of the carcass 2.

Figure 9:
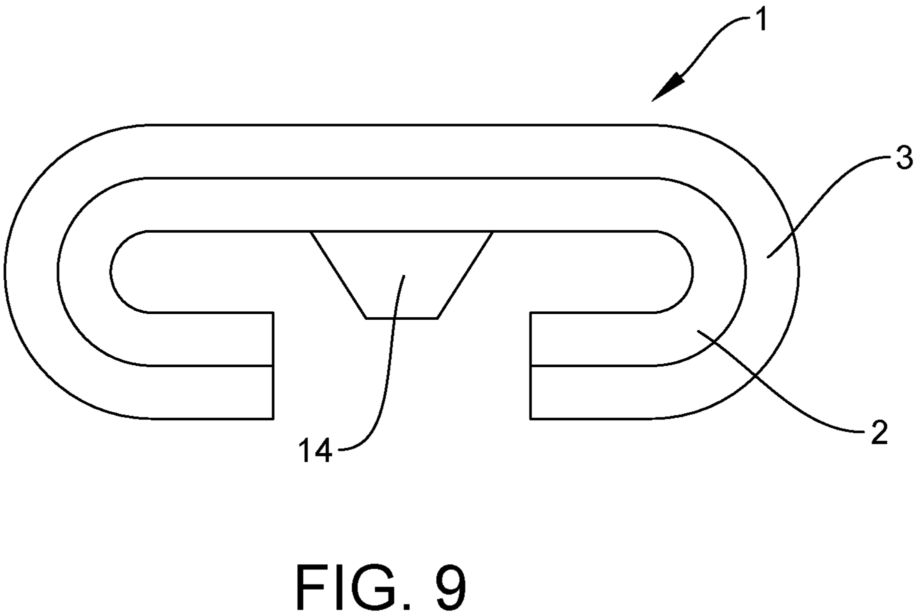
FIG. 9 is a schematic section transverse to the profile direction of a handrail according to an embodiment of the present invention.

FIG. 9 is a schematic section transverse to the profile direction C of a handrail 1 according to a further embodiment of the present invention. The handrail 1 shown in FIG. 9 essentially corresponds to the handrail 1 shown in FIG. 8, with the difference that the handrail 1 of the present embodiment has a wedge 14 that projects from the carcass 2 towards the guide element. This allows the wedge 14 to be engaged with the guide element to improve the guidance of the handrail 1 by the guide element. Furthermore, this can reduce the transverse load on the end sections 13 of the handrail 1, which means that the end sections 13 can be less pronounced. The wedge 14 can be made of the same material as the carcass 2.

Figure 10:
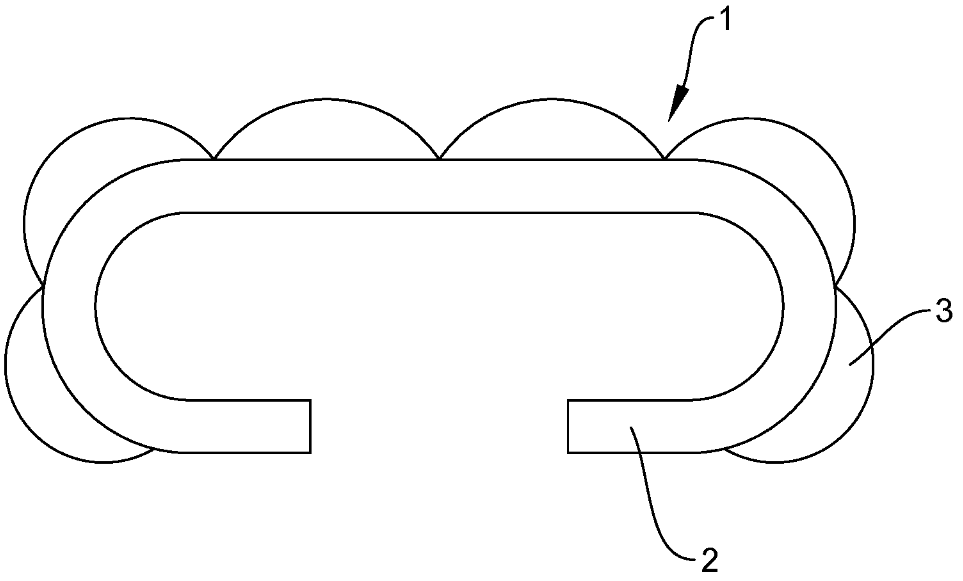
FIG. 10 is a schematic section transverse to the profile direction of a handrail according to an embodiment of the present invention.

FIG. 10 is a schematic sectional view transverse to the profile direction C of a handrail 1 according to a further embodiment of the present invention. The handrail 1 shown in FIG. 10 essentially corresponds to the handrail 1 shown in FIG. 8, with the difference that the handrail 1 of the present embodiment has a cover layer 3, which is provided with a number of curvatures on the carcass 2. In this embodiment, the handrail 1 also has a constant cross-section along the profile direction C. The curvatures therefore extend along the profile direction in a strip. Consequently, the surface of the cover layer 3, which is gripped by the user, can have a textured surface.

Figure 11:
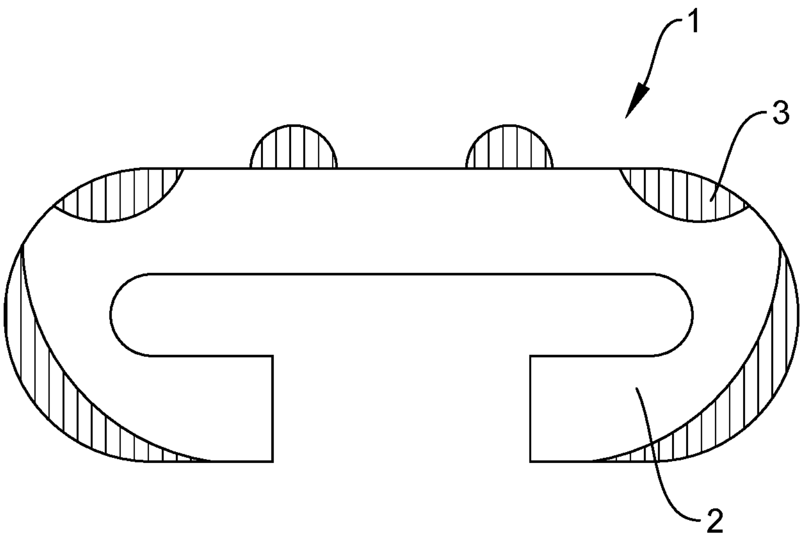
FIG. 11 is a schematic section transverse to the profile direction of a handrail according to an embodiment of the present invention.

FIG. 11 is a schematic sectional view transverse to the profile direction C of a handrail 1 according to a further embodiment of the present invention. The handrail 1 shown in FIG. 11 essentially corresponds to the handrail 1 shown in FIG. 8, with the difference that the handrail 1 of the present embodiment has a cover layer 3 which is only provided in places on the carcass 2 in the cross-section transverse to the profile direction C. The cover layer 3 is provided at two points in the centre area 12 as protrusions or curvatures on the carcass 2. The cover layer 3 is present at four further points on the carcass 2, in particular in the end areas 13, in such a way that the cover layer 3 forms a flush or flat surface with the carcass 2, which can be gripped by a user. In the present embodiment, more than half of the surface of the carcass 2 exposed to the environment is covered by the cover layer 3. A high degree of resistance of the handrail 1 to environmental factors can therefore be achieved, while saving on the material of the cover layer 3.

Furthermore, individual embodiments can be combined with each other to form further embodiments.

LIST OF REFERENCE SIGNS

1 Handrail
2 Carcass
3 Cover layer
4 Primary layer
5 Secondary layer
6 Tensile element
7 Holes
8 Surface texture
9 Sliding layer
10 Finish
11 Fibre reinforcement
12 Central area
13 End area
14
Wedge
Profile direction
C

The invention claimed is:

1. A handrail mountable on a guide element for moving walkways and escalators, the handrail having a substantially constant cross-section along a profile direction of the handrail, the handrail comprising:

a carcass configured to be arranged on the guide element; and a cover layer arranged on the carcass, the cover layer comprising a thermoplastic elastomer;

wherein the carcass has a primary layer facing the cover layer and a tension element which extends in the profile direction of the handrail;

wherein the primary layer is formed from a vulcanized rubberised fabric;

wherein the primary layer comprises at least one of chloroprene rubber, natural rubber, styrol-butadiene rubber and/or polybutadiene rubber; and wherein the carcass includes a secondary layer so that the tensile element is inserted between the primary layer and the secondary layer.

2. The handrail according to claim 1, wherein the thermoplastic elastomer comprises polyurethane.

3. The handrail according to claim 2, wherein the carcass comprises at least three different layers and is configured to give the handrail stability along the profile direction and transversely to the profile direction.

4. The handrail according to claim 3, wherein the primary layer has fibre reinforcement transverse to the profile direction of the handrail, and wherein the fibre reinforcement comprises at least one of glass, carbon, polyamide and polyester.

5. The handrail according to claim 4, wherein the primary layer has a number of holes at least on the side facing the cover layer.

6. The handrail according to claim 5, wherein the primary layer has a surface texture on a side facing the cover layer.

7. The handrail according to claim 6, wherein the surface texture includes indentations in at least one of the profile direction and a direction transverse to the profile direction.

8. The handrail according to claim 6, wherein the primary layer has an adhesion promoter on the side facing the cover.

9. The handrail according to claim 8, wherein the adhesion promoter includes an insert with a polyurethane-friendly finish.

10. The handrail according to claim 8, wherein the handrail comprises a sliding layer arranged on the carcass such that the sliding layer can be brought into contact with the guide element.

11. The handrail according to claim 10, wherein the secondary layer comprises a fabric structure or tape structure.

12. The handrail according to claim 1, wherein the tension element comprises at least one of steel, aramid, glass fibre and carbon.

13. The handrail according to claim 1, wherein the carcass comprises at least three different layers and is configured to give the handrail stability along the profile direction and transversely to the profile direction.

14. The handrail according to claim 1, wherein the primary layer has fibre reinforcement transverse to the profile direction of the handrail, and wherein the fibre reinforcement comprises at least one of glass, carbon, polyamide and polyester.

15. The handrail according to claim 1, wherein the primary layer has a number of holes at least on the side facing the cover layer.

16. The handrail according to claim 1, wherein the primary layer has a surface texture on a side facing the cover layer.

17. The handrail according to claim 1, wherein the primary layer has an adhesion promoter on the side facing the cover.

18. The handrail according to claim 1, wherein the handrail comprises a sliding layer arranged on the carcass such that the sliding layer can be brought into contact with the guide element.

19. The handrail according to claim 1, wherein the secondary layer comprises a fabric structure or tape structure.

20. A method of manufacturing a handrail according to claim 1, wherein the method comprises:

providing the carcass;

applying the cover layer to the carcass via at least one compression moulding, casting, dipping, painting and extrusion, wherein the cover layer comprises a thermoplastic elastomer.

* * * * *